(12) United States Patent
Wahl

(10) Patent No.: US 8,602,344 B2
(45) Date of Patent: Dec. 10, 2013

(54) SENSOR UNIT FOR ACTIVATING A BLOCKING MECHANISM FOR A BELT RETRACTOR OF A MOTOR VEHICLE

(75) Inventor: Norbert Wahl, Weilheim (DE)

(73) Assignee: Takata AG, Aschaffenburg (DE)

( * ) Notice: Subject to any disclaimer, the term of this patent is extended or adjusted under 35 U.S.C. 154(b) by 1059 days.

(21) Appl. No.: 12/458,346

(22) Filed: Jul. 8, 2009

(65) Prior Publication Data

US 2009/0272833 A1 Nov. 5, 2009

Related U.S. Application Data

(63) Continuation of application No. PCT/EP2008/050114, filed on Jan. 8, 2008.

(30) Foreign Application Priority Data

Jan. 18, 2007 (DE) ...................... 20 2007 000 909 U

(51) Int. Cl.
*B60R 22/40* (2006.01)

(52) U.S. Cl.
USPC ................. 242/384; 242/384.2; 242/384.6

(58) Field of Classification Search
USPC .................................. 242/384, 384.2, 384.6
See application file for complete search history.

(56) References Cited

U.S. PATENT DOCUMENTS

| | | | | |
|---|---|---|---|---|
| 3,958,774 A * | 5/1976 | Penzkofer et al. | ......... | 242/384.3 |
| 4,014,480 A | 3/1977 | Fisher | | |
| 4,077,584 A | 3/1978 | Lafont | | |
| 4,135,410 A * | 1/1979 | Filderman | ................ | 74/411.5 |
| 4,736,902 A * | 4/1988 | Doty | ........................... | 242/384.2 |
| 4,934,626 A | 6/1990 | Kimura | | |
| 4,979,695 A * | 12/1990 | Matsuki et al. | ........... | 242/384.6 |
| 6,364,239 B1 * | 4/2002 | Jallot et al. | ................. | 242/384.4 |
| 2001/0028167 A1 | 10/2001 | Kielwein et al. | | |
| 2003/0234310 A1 | 12/2003 | Kielwein et al. | | |
| 2006/0144984 A1 | 7/2006 | Daeuber et al. | | |

FOREIGN PATENT DOCUMENTS

| | | |
|---|---|---|
| DE | 24 20 549 A1 | 2/1975 |
| DE | 26 24 765 A1 | 12/1976 |
| DE | 36 11 004 A1 | 10/1987 |
| DE | 89 06 946 U1 | 10/1989 |
| DE | 90 01 078.7 U1 | 5/1990 |
| DE | 43 15 072 C2 | 3/1995 |
| DE | 200 06 314 U1 | 9/2000 |
| DE | 102 30 211 B4 | 1/2004 |
| DE | 203 12 288 U1 | 1/2004 |
| DE | 103 13 326 A1 | 10/2004 |
| DE | 10 2004 016 501 A1 | 3/2005 |
| DE | 10 2004 032 190 A1 | 2/2006 |
| DE | 10 2005 045 536 A1 | 3/2006 |
| EP | 0 335 360 A2 | 10/1989 |
| EP | 0 795 447 B2 | 9/1997 |
| WO | WO 2004/005085 A1 | 1/2004 |

* cited by examiner

*Primary Examiner* — Sang Kim
(74) *Attorney, Agent, or Firm* — Foley & Lardner LLP

(57) ABSTRACT

A sensor unit for activating a blocking mechanism for a belt retractor of an occupant protection system for motor vehicles is provided. The sensor unit comprising a sensor element, a receptacle for displaceably mounting the sensor element so that it is deflected by the impact of forces acting transversally to weight, and a coupling mechanism coupling the sensor element with a blocking mechanism of a belt retractor in such a manner that the blocking mechanism is triggered by a deflection of the sensor element. The sensor element has a mean roughness depth of at least 0.1 μm at least in such areas of its surface by which the sensor element rests against a bearing surface of the receptacle.

15 Claims, 1 Drawing Sheet

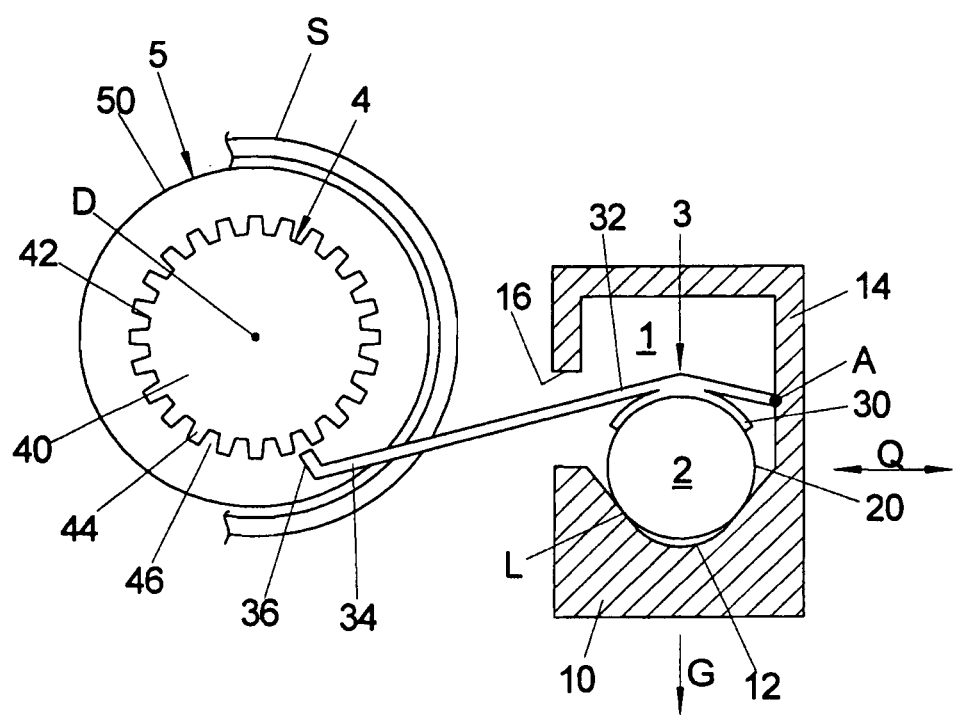

US 8,602,344 B2

SENSOR UNIT FOR ACTIVATING A BLOCKING MECHANISM FOR A BELT RETRACTOR OF A MOTOR VEHICLE

CROSS-REFERENCE TO RELATED PATENT APPLICATIONS

This application is a Continuation of International Application No. PCT/EP2008/050114, filed Jan. 8, 2008, which claims priority to German Utility Model Application No. 20 2007 000 909.7, filed Jan. 18, 2007, both of the foregoing applications are incorporated herein by reference in their entireties.

BACKGROUND

The application relates to a sensor unit for activating a blocking mechanism for a belt retractor of a motor vehicle.

Such a sensor unit comprises a sensor element of a certain mass; a receptacle in which the sensor element is displaceably mounted; as well as a coupling mechanism coupling the sensor element with a blocking mechanism assigned to the belt retractor so that the blocking mechanism can be activated by a displacement of the sensor element in the receptacle via the coupling mechanism and thereby blocks a displacement of the belt retractor.

In such a sensor unit the sensor element, due to its mass under normal operating conditions of the motor vehicle, is kept in a defined position within the assigned receptacle of the sensor unit by gravity acting upon the sensor element. However, if accelerating forces act upon the sensor element transversally to gravity caused by a deceleration of the vehicle for instance as a result of strong braking action of the motor vehicle or in the case of a crash, the sensor element being in the receptacle is displaced out of its resting position and acts upon the coupling mechanism arranged downstream of the sensor element in such a manner that the blocking mechanism assigned to the belt retractor is activated. Through this, the belt retractor is blocked for further (rotational) displacement so that a safety belt of the motor vehicle assigned to the belt retractor is hindered in a further belt pullout, so that a vehicle occupant using the safety belt is kept in its vehicle seat in a safely manner.

The sensor element in such a sensor unit is typically formed as a metallic ball and the receptacle assigned to it usually consists of plastics with (calotte) areas for mounting the ball. However, also other constructional systems are conceivable as long as it is guaranteed that the sensor element (which is kept practically in a rest position by gravity under normal operating conditions of a motor vehicle) is displaced or deflected in such a manner in case of a vehicle deceleration exceeding a certain level that the blocking mechanism of the belt retractor is activated by the coupling mechanism arranged downstream of the sensor element and thereby the belt retractor is blocked.

The bearing surfaces of the receptacle are formed for instance by an appropriate selection of material and/or by polishing in such a manner that an easy displacement of the sensor element especially a sensor ball is facilitated by forces acting transversally to weight.

Such sensor units (also called vehicle sensitive sensor units) have to be protected from contamination specifically by (viscous) liquid substances which could lead to an adhesion of the sensor element to its assigned inner surface of the receptacle. Because by this the activation of the blocking mechanism would be delayed so that a larger belt pullout would result until the belt retractor can be blocked.

SUMMARY

An object of the present invention is to provide a sensor unit of the afore-mentioned kind having a reduced sensitivity to contamination.

According to an exemplary embodiment of the invention, the sensor element has at its surface, over which it is mounted in the assigned receptacle, a minimum roughness depth of 0.1 µm, in particular of more than 0.1 µm.

Further minimum roughness depths of 0.2 µm and in particular of 0.4 µm are beneficial.

The minimal roughness depth of the surface of the sensor element is to be understood as the minimum value of the roughness depth (thus the so called mean roughness depth) averaged over the surface (or at least a representative part of the surface). An indication whereby the minimum roughness depth has the value x means therefore that the roughness depth ("mean roughness depth") averaged over the surface of the sensor element has at least the value x.

Due to such an increased roughness depth of the sensor element in particular in way of a (metallic) sensor ball the risk of an adhesion of the sensor element to the assigned surfaces of the receptacle during the infiltration of foreign substances into the sensor unit or into the receptacle of the sensor unit is reduced so that the sensor unit in its whole is more robust to possible disturbances of its function caused by foreign substances.

The receptacle in which the sensor element is arranged or mounted is for instance formed as a housing equipped for the movable reception of the sensor element and it has an opening or an open top surface through which the coupling mechanism affecting the sensor element is lead to the assigned blocking mechanism.

The receptacle or the housing is provided with a bearing section defining a bearing area for displaceably mounting the sensor element formed by an inner surface of the bearing section which faces the sensor element and in particular in such a manner that the bearing area (viewed in the cross section) is tapered along the direction of the gravity acting on the sensor element. Due to the effect of the gravity the sensor element rests under normal operation conditions of the vehicle against the bearing area in an aligned or laminar manner and is lifted along the bearing area due to the effect of a transversally acting force occurring in the case of a heavy velocity change of the vehicle and thereby affecting the coupling mechanism in such a way that it activates the blocking mechanism.

The coupling mechanism can for instance comprise a steering element affecting the sensor element, in particular in the form of a steering lever to which downstream a pawl is arranged which is formed integrally at the steering lever or (flexibly) connected to the same whereby the pawl can engage with the blocking mechanism in order to activate it and to block the belt retractor.

The blocking mechanism can comprise a ratchet wheel with engagement recesses formed for instance by a toothing revolving around the ratchet wheel into which the pawl of the coupling mechanism can engage when the pawl is operated as a result of a deflection of the sensor element. Due to the engagement of the pawl into the ratchet wheel, more precisely into an engagement recess of the ratchet wheel, the ratchet wheel is blocked, namely prevented from a further rotation around its rotational axis. By connecting the ratchet wheel with the belt retractor and for instance by mounting it around a common rotational axis simultaneously the belt retractor is blocked so that no further belt pullout can occur.

BRIEF DESCRIPTION OF THE DRAWINGS

Further details and advantages of the invention become apparent in the following description of an exemplary embodiment on the basis of the FIGURE.

DETAILED DESCRIPTION

The FIGURE shows a schematic cross section through a sensor unit with a housing-like receptacle 1 and a sensor element 2 arranged therein in the form of a (metallic) ball as well as a coupling mechanism 3 arranged downstream of the sensor element 2 for coupling the sensor unit with a blocking mechanism 4 through which a belt retractor 5 of a vehicle is blockable.

The housing-like receptacle 1 has, for mounting the sensor element 2 in form of a ball, a bearing section 10 with at least one bearing area 12, tapering into the direction of the weight G affecting the sensor element 2, on which the sensor element 2 is beard under the effect of the weight G in such a manner that it is held up with its surface 20 basically line-like along a circumferential line L on the bearing area 12. It is understood that the sensor element 2 can also hold up itself on a large scale on the bearing area 12 of the bearing section 10, in particular while the bearing area 12 has a curve corresponding to the sensor element surface 20.

The housing-like receptacle 1 has furthermore a wall section 14 enclosing the sensor element 2 on the side opposing the bearing section 10 and which is provided with an opening 16 through which the coupling mechanism 3 is guided from the sensor element 2 to the blocking mechanism 4.

The coupling mechanism 3 over which the sensor element 2 is in an operative connection with the blocking mechanism 4 assigned to the belt retractor 5 has on the input side (the side of the sensor element) a cap-like element 30 which overlaps and compasses the surface 20 of the sensor element in a surface section averted to the bearing area 12 and which is connected via a steering lever 32 being pivotable around an axis A and mounted on the housing-like receptacle 1 with an output side pawl 34 of the coupling mechanism 3. The pawl 34 forms on hand a one piece element of the steering lever 32 and is provided with a sprocket 36 which can for activating (blocking) the blocking mechanism 4 engage into the same.

The blocking mechanism 4 on hand is formed by a blocking wheel 40 having a blocking toothing 44, 46 at its outer periphery 42 formed by teeth 44 arranged successively along the peripheral direction of the blocking wheel 4 and gaps 46 located between the same. The gaps 46 serve as engagement recesses into which the sprocket 36 positioned at the pawl side can engage for blocking the blocking wheel 40 forming the blocking mechanism 4.

The blocking wheel 40 is rotatably mounted around a rotational axis D together with the belt retractor 5 (of which only the belt coil 50 is shown in the FIGURE) and is connected with the belt retractor 5 in such a manner that by blocking the blocking wheel 40 by engagement of the pawl side sprocket 36 in an engagement recess 46 of the blocking wheel 40 at the same time also the belt retractor 5 is blocked, i.e. in the activated state of the blocking mechanism 4—that is when the pawl 34 engages via its sprocket 36 in one engagement recess 46 of the blocking wheel 40—the blocking wheel 40 as well as the belt retractor 5 are arrested in such a manner that they cannot move around their common rotational axis D. This means in particular that a further belt pullout of a safety belt G arranged to the belt retractor 5 is prevented.

Such a sensor unit functions in such a manner that in case of an acceleration causing a jerky change of the vehicle velocity, for instance as a consequence of a heavy breaking action or an accident, lateral forces Q acting vertically to weight G on the sensor element 2 formed by a ball whereby the sensor element 2 is displaced along the corresponding bearing area 12 with a component along the direction of the lateral forces Q and whereby the sensor element 2 is simultaneously lifted against the weight G. Through this the sensor element 2 affects the cap-like element 30 of the coupling mechanism 3. A deflection of the sensor element 2 caused by the lateral forces Q effects via the cap-like element 30 a deviation of the steering lever 32 of the coupling mechanism 3 around its housing-like axis A, namely in such a manner that the sprocket 36 of the pawl 34 provided at the steering lever 32 engages into a bearing recess 46 of the blocking toothing 44, 46 of the blocking wheel 40. Through this the desired blocking of the belt retractor 5 connected to the blocking wheel 40, specifically of the belt coil 50 of the belt retractor 5, is achieved.

In such an arrangement the reaction time of the blocking mechanism 4, i.e. the time elapsing between launching the lateral forces Q into the sensor unit 1, 2, 3 and the activation of the blocking mechanism 4, namely the locking of the blocking wheel 40 can be delayed if foreign substances, in particular (viscous) liquid substances have been infiltrated into the housing-like receptacle 1 in which the sensor element 2 is mounted. The latter can lead to an increased adhesion of the ball forming the sensor element 2 with its ball surface 20 on the bearing area 12 of the housing side bearing section 10 so that the sensor element 2 is deflected only with delay by the action of lateral forces Q out of the resting position shown in the FIGURE.

In order to prevent such an extension of the reaction time of the sensor unit 1, 2, 3 the sensor element 2 has at hand on its surface 20 a mean roughness depth of at least 0.1 µm, in particular of at least 0.2 µm and especially preferred of ca. 0.4 µm. Herewith adhesive forces generated by possible foreign substances between the surface 20 of the sensor element 2 and the (polished) bearing area 12 of the housing-like bearing section 10 can considerably be reduced so that the reaction time of the sensor unit 1, 2, 3 is not considerably affected by the mentioned foreign substances.

The invention claimed is:

1. A sensor unit for activating a blocking mechanism for a belt retractor of an occupant protection system for motor vehicles comprising:
   a sensor element,
   a receptacle for displaceably mounting of the sensor element so that the sensor element is deflected by the impact of forces acting transversally to weight, and
   a coupling mechanism coupling the sensor element with the blocking mechanism of the belt retractor in such a manner that the blocking mechanism is triggered by a deflection of the sensor element,
   wherein the sensor element has a mean roughness depth of at least 0.1 µm at least in such areas of its surface by which the sensor element rests against a bearing surface of the receptacle.

2. The sensor unit as claimed in claim 1, wherein the mean roughness depth of the sensor element at its surface is more than 0.1 µm.

3. The sensor unit as claimed in claim 2, wherein the mean roughness depth of the sensor element at its surface is at least 0.2 µm.

4. The sensor unit as claimed in claim 3, wherein the mean roughness depth of the sensor element at its surface is at least 0.4 μm.

5. The sensor unit as claimed in claim 1, wherein the sensor element is made of metal.

6. The sensor unit as claimed in claim 1, wherein the sensor element is formed by a ball.

7. The sensor unit as claimed in claim 1, wherein the sensor element is kept in a rest position by a weight affecting the sensor element out of which it is deflected by lateral forces.

8. The sensor unit as claimed in claim 1, wherein the bearing surface for the sensor element is tapered into the direction of the weight affecting the sensor element.

9. The sensor unit as claimed in claim 1, wherein the receptacle for the sensor element is formed as a housing.

10. The sensor unit as claimed in claim 9, wherein the housing has an opening through which the coupling mechanism is guided to the blocking mechanism.

11. The sensor unit as claimed in claim 1, wherein the coupling mechanism comprises a steering lever being on the one hand in contact with the sensor element so that it is displaced by a deflection of the sensor element, and on the other hand engaged with the blocking mechanism by a displacement caused by a deflection of the sensor element in order to activate the blocking mechanism.

12. The sensor unit according to claim 11, wherein the steering lever is mounted pivotably around an axis.

13. The sensor unit as claimed in claim 1, wherein the coupling mechanism comprises a pawl which can mesh with at least one engagement recess of the blocking mechanism for activating the blocking mechanism.

14. The sensor unit according to claim 13, wherein the blocking mechanism comprises a blocking wheel connected to the belt retractor so that the belt retractor is blockable by locking the blocking wheel and the at least one engagement recess is provided on the blocking wheel.

15. The sensor unit as claimed in claim 1, wherein the blocking mechanism comprises a blocking wheel connected to the belt retractor so that the belt retractor is blockable by locking the blocking wheel.

* * * * *